(12) United States Patent
Hughes

(10) Patent No.: US 6,350,099 B1
(45) Date of Patent: Feb. 26, 2002

(54) DEVICE FOR TRANSPORTING BASKET PRODUCTS

(76) Inventor: Clyde M. Hughes, 529 Co. Rd. 375, Billingsley, AL (US) 36006

( * ) Notice: Subject to any disclaimer, the term of this patent is extended or adjusted under 35 U.S.C. 154(b) by 0 days.

(21) Appl. No.: 09/610,848

(22) Filed: Jul. 5, 2000

Related U.S. Application Data

(60) Provisional application No. 60/146,346, filed on Aug. 2, 1999.

(51) Int. Cl.[7] ................................................. B60P 1/36
(52) U.S. Cl. ....................... 414/527; 414/510; 414/515; 414/521; 414/525.1
(58) Field of Search .................. 414/527, 521, 414/514, 528, 515, 510, 525.1

(56) References Cited

U.S. PATENT DOCUMENTS

| | | | |
|---|---|---|---|
| 2,912,129 A | * 11/1959 | Varrone | 414/527 |
| 3,142,396 A | * 7/1964 | Pauley et al. | 414/502 X |
| 3,181,714 A | * 5/1965 | Kappen | 104/257 |
| 4,642,018 A | * 2/1987 | Leroux et al. | 414/502 |
| 5,618,146 A | * 4/1997 | Cooper | 414/521 X |

FOREIGN PATENT DOCUMENTS

| | | | |
|---|---|---|---|
| GB | 2175566 | * 12/1986 | 414/527 |

* cited by examiner

Primary Examiner—Steven A. Bratlie

(57) ABSTRACT

A conveyor system for transporting products such as baskets of fruits and vegetables on the back of a truck. The system has a plurality of tracks attached to opposite sides of the truck cargo area upon which ride shelves which have wheels to support the shelves on the tracks. A cable is attached to the shelves and is motor driven to deliver the shelves (and the products resting on the shelves) to either the front of the cargo area (for loading) or to the back of the cargo area (for unloading).

8 Claims, 2 Drawing Sheets

DEVICE FOR TRANSPORTING BASKET PRODUCTS

This application claims benefit of Provisional No. 60/146,346 filed Aug. 2, 1999.

BACKGROUND OF THE INVENTION

This invention relates, in general, to conveyors, and, in particular, to a conveyor for transporting products on trucks or other vehicles.

SUMMARY OF THE INVENTION

The present invention is directed to a conveyor system for transporting products such as baskets of fruits and vegetables on the back of a truck. The system has a plurality of tracks attached to opposite sides of the truck cargo area upon which ride shelves which have wheels to support the shelves on the tracks. A cable is attached to the shelves and is motor driven to deliver the shelves (and the products resting on the shelves) to either the front of the cargo area (for loading) or to the back of the cargo area (for unloading).

It is an object of the present invention to provide a new and improved conveyor system for transporting basket products on the cargo area of a truck.

It is an object of the present invention to provide a new and improved conveyor system which can be assembled onto a truck regardless of the truck size.

It is an object of the present invention to provide a new and improved conveyor system which is inexpensive to assemble and convenient to use.

These and other objects and advantages of the present invention will be fully apparent from the following description, when taken in connection with the annexed drawings.

DESCRIPTION OF THE PREFERRED EMBODIMENT

Figure 1:
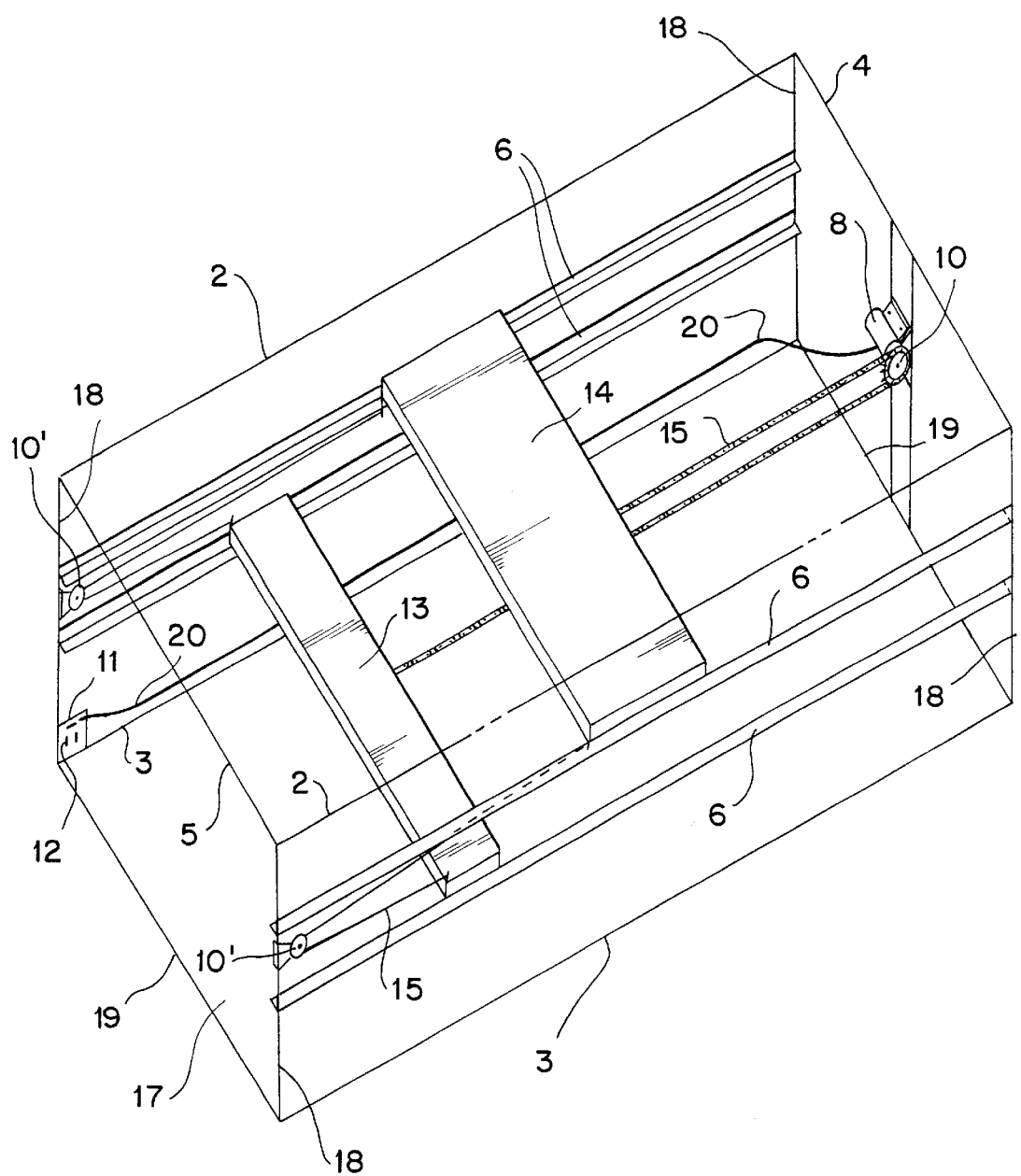
FIG. 1 is perspective view of the present invention.
Figure 2:
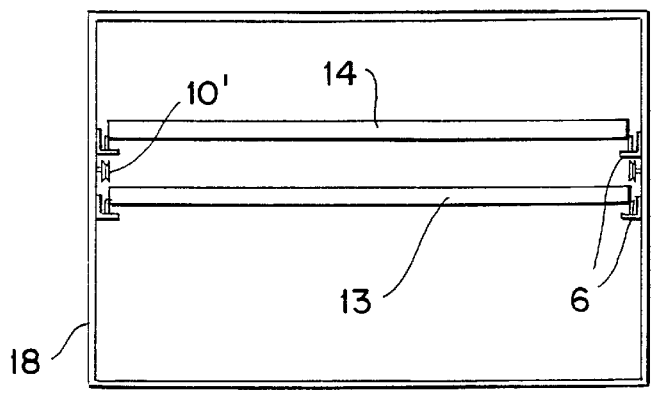
FIG. 2 is a back end view of the present invention.

Referring now to the drawings in greater detail, FIG. 1 shows the conveyor system 1 of the present invention. The invention is designed to be used with a truck having an open cargo area on the back. The size of the truck is not material and the conveyor system 1 of the present invention can be adjusted in size to fit any type and size of truck.

The system comprises a series of vertical upright supports 18, horizontal supports 2, at the top of the structure, and 3 at the bottom of the structure. In addition, horizontal supports 4, 5, at the front and rear of the structure extend between top horizontal supports 2, and horizontal supports 19, at the front and rear of the structure extend between bottom horizontal supports 3. In addition, vertical support 18 extends from the bottom of the structure to the top to add support and to perform other functions, which will be detailed below.

It should be noted, that while the present invention is described with having vertical and horizontal supports, it could also include surfaces between these supports to add stability and to protect the cargo being carried. For example, solid sheets of plywood, or other material, could be attached to the sides of the structure between members 2, 3, and to the front of the structure (the end closest to the driver compartment of the truck, not shown) between members 4, 19. The sheets of plywood, or other material, have not been shown in the drawings for purposes of clarity.

Attached to the sides of the structure are two pair of tracks 6. The tracks are arranged in two rows, an upper row and a lower row. The preferred shape of the tracks are L-shaped and the tracks are made from angle iron, however, other shapes and materials could be used without departing from the scope of the invention. Also, even though two pair of tracks are shown, it should be understood that fewer or more tracks could be used depending on the size of the truck and the type of produce being carried.

Toward the front of the structure is mounted a reversible DC motor 8 which is mounted on the vertical upright 18, and can be electrically connected to the electrical system of the truck in any conventional manner. The motor 8 has an output shaft 9 which is connected to conventional chain sprocket pulley 10, which is mounted on the vertical upright 7. The motor 8 is also electrically connected through wires 20 to a control box 11 mounted near the rear of the structure. The control box 11 will have a switch 12 which will turn the motor 8 on and off, and reverse the motor. Also, only one motor is shown connected, through the chain sprocket 10 and the chains 15 and the pulleys 10' to the shelves 13, 14, however, if desired a separate motor and pulley system could be used to connect the upper and lower rows of shelves. The type of switch and motor used is not critical and therefore, any conventional switch or motor can be used. Therefore, no further descrition of the switch or motor are necessary.

Figure 3:
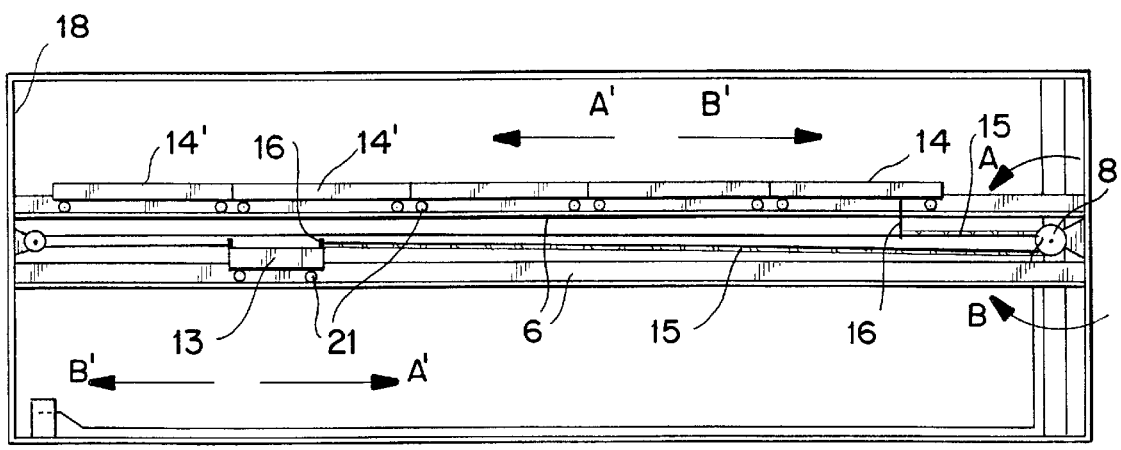
FIG. 3 is a side view of the present invention.

As shown in FIGS. 1 and 3, shelves 13, 14, 14' are mounted on the tracks 6. As more clearly shown in FIG. 3, the shelves have rollers or wheels 21 which will allow the shelves to move along the tracks with a minimum of effort. In addition, at least one of the shelves 14 on the upper row, and 13 on the lower row, have projections 16, which will allow these shelves to be attached to chains 15 (similar to a bicycle chain), in any conventional manner.

In order to use the conveyor system of the present invention, a user would turn on the motor 8, using the switch 11 and select the direction the motor is to run, clockwise or counter clockwise as shown by the arrows A, B in FIG. 3. In loading the conveyor system, the user would turn the motor 8 on so it would move clockwise (arrow B) until the upper shelf 14 moves far enough to the front of the structure in the direction shown by arrow B', to allow another shelf 14' to be placed on the upper track system. The shelves, of course, would carry baskets or boxes of fruit, vegetables or other items of produce (not shown). The user could continue with this sequence of loading until no more shelves will fit on the upper row of trachs 6 or until he/she has loaded all the shelves desired.

When the user wanted to unload the shelves, he/she would turn the motor 8 on so it would turn in the direction of the arrow A in FIG. 3. Since the shelf 14 is connected to the chain 15 it would move in the direction of the arrow A' and push all the other shelves 14' toward the rear of the structure so the produce on them could be unloaded. When the first shelf is unloaded, it will be removed from the tracks 6 and the next shelf will be moved into position, to be unloaded, by the motor 8.

The lower track will be loaded and unloaded in substantially the same manner. It should be noted that the lower shelf 13 can be positioned on the chain 15 at any desired position, so if fewer shelves will be loaded on the lower track, the shelf would be positioned as shown in FIG. 3.

However if more shelves are to be loaded on the lower track, the shelf 13 would be positioned on the chain 15 further toward the front of the structure (toward the right in FIG. 3).

Although the device for transporting basket products and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A conveyor system for transporting products on the cargo area of a truck, said system comprising:

a support system comprising at least two vertical supports and at least one horizontal support, said at least two vertical supports extending from a front area to a rear area, said at least one horizontal support extending between said at least two vertical supports, means on said at least two vertical supports for supporting movable platforms, means for moving said movable platforms between said front and rear areas, and wherein said means for moving said movable platforms between said front and rear areas is a chain, said chain being connected directly at one end to one of said movable platforms, and said chain being connected directly at another end to another of said movable platforms, and means for moving said chain to move said movable platforms between said front and rear areas, and wherein said movable platforms are mounted on an upper level and on a lower level with at least one movable platform on said upper level and at least one movable platform on said lower level.

2. The conveyor system as claimed in claim 1, wherein said means for moving said chain is a motor.

3. The conveyor system as claimed in claim 2, wherein said motor is a reversible motor.

4. The conveyor system as claimed in claim 3, wherein said motor is mounted at said front area, and a control box is mounted at said rear area, said control box having means for turning on and off said motor and for reversing said motor.

5. The conveyor system as claimed in claim 1, wherein said chain is connected to projections which are, in turn, connected to said movable platforms.

6. The conveyor system as claimed in claim 1, wherein said movable platforms have wheels mounted thereon, and said wheels engage said means on said at least two vertical supports for supporting said movable platforms.

7. The conveyor system as claimed in claim 6, wherein said means on said at least two vertical supports for supporting said movable platforms are tracks.

8. The conveyor system as claimed in claim 7, wherein said tracks are L-shaped.

\* \* \* \* \*